Jan. 17, 1956 R. K. HEINEMAN 2,730,846
CUTTING TOOL GRINDING FIXTURE
Filed March 20, 1952 5 Sheets-Sheet 1
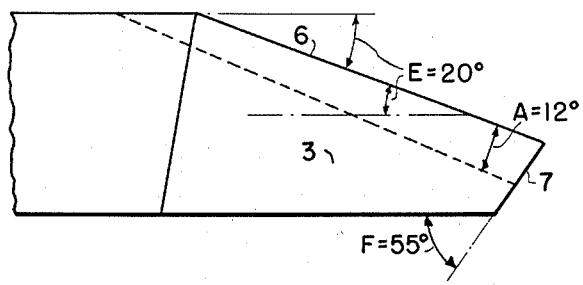
Fig. 1
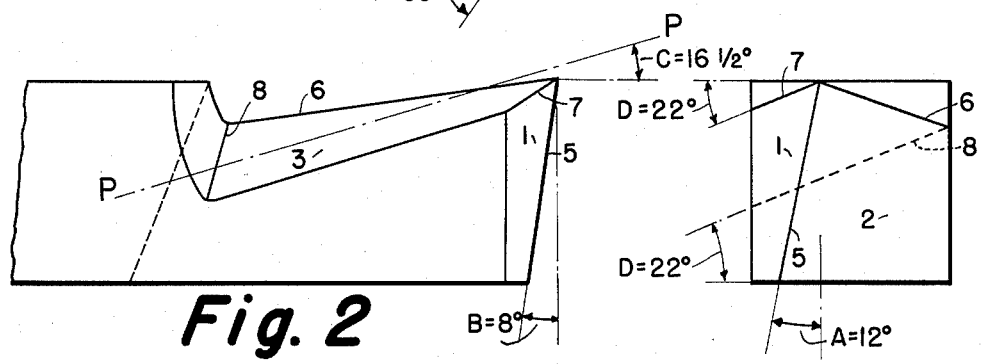
Fig. 2
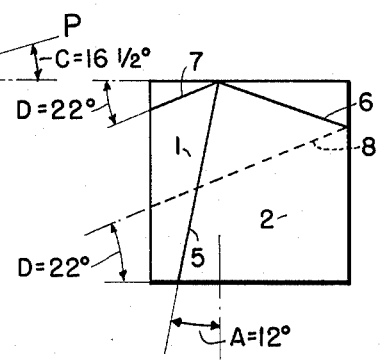
Fig. 3
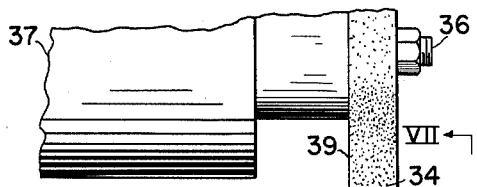
Fig. 6
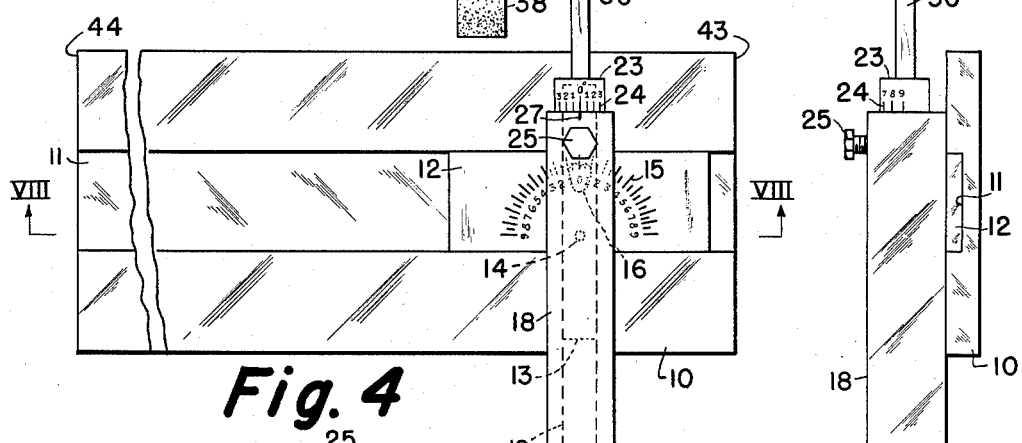
Fig. 4
Fig. 5
INVENTOR.
Robert K. Heineman
BY
Webb, Mackey + Burdu
HIS ATTORNEYS Jan. 17, 1956 R. K. HEINEMAN 2,730,846
CUTTING TOOL GRINDING FIXTURE
Filed March 20, 1952 5 Sheets-Sheet 2

INVENTOR.
Robert K. Heineman
BY
HIS ATTORNEYS

Jan. 17, 1956     R. K. HEINEMAN     2,730,846
CUTTING TOOL GRINDING FIXTURE
Filed March 20, 1952     5 Sheets-Sheet 3
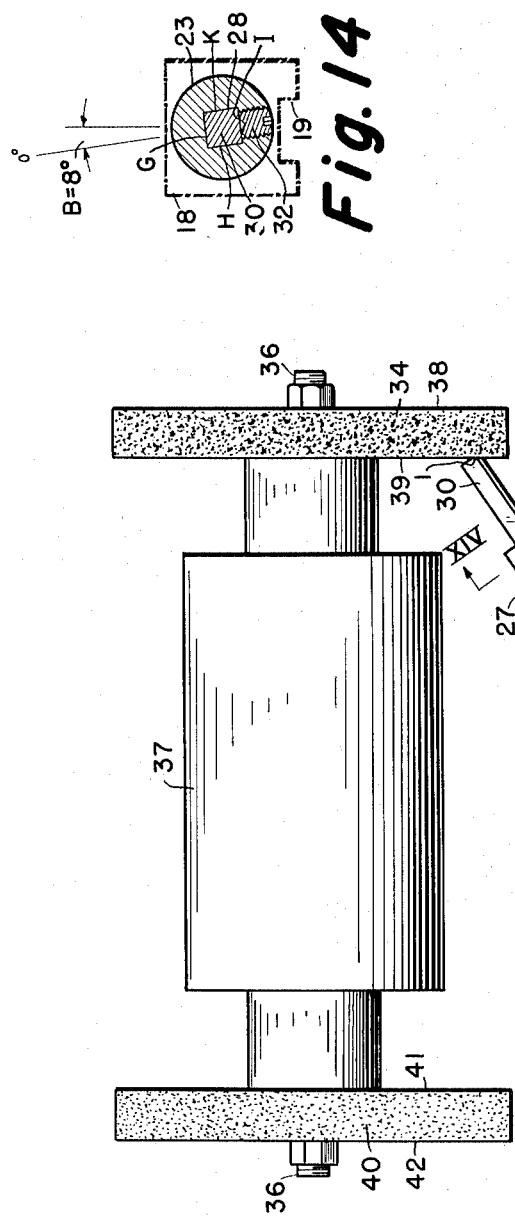
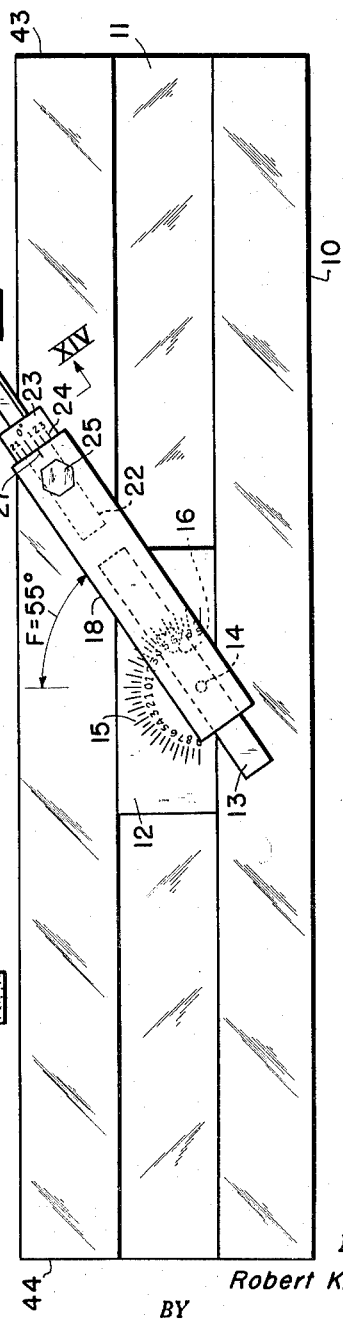
INVENTOR.
Robert K. Heineman
BY
HIS ATTORNEYS

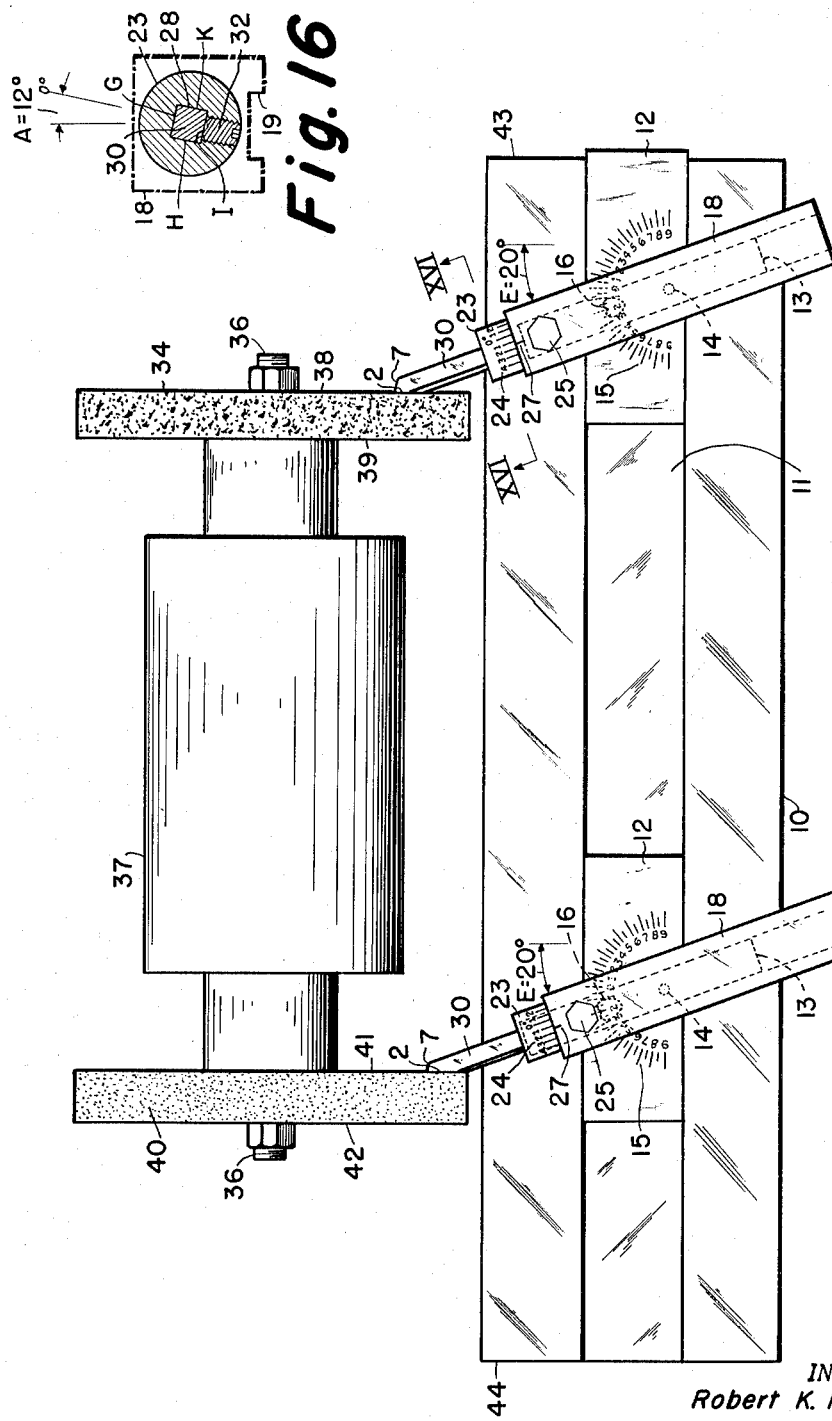

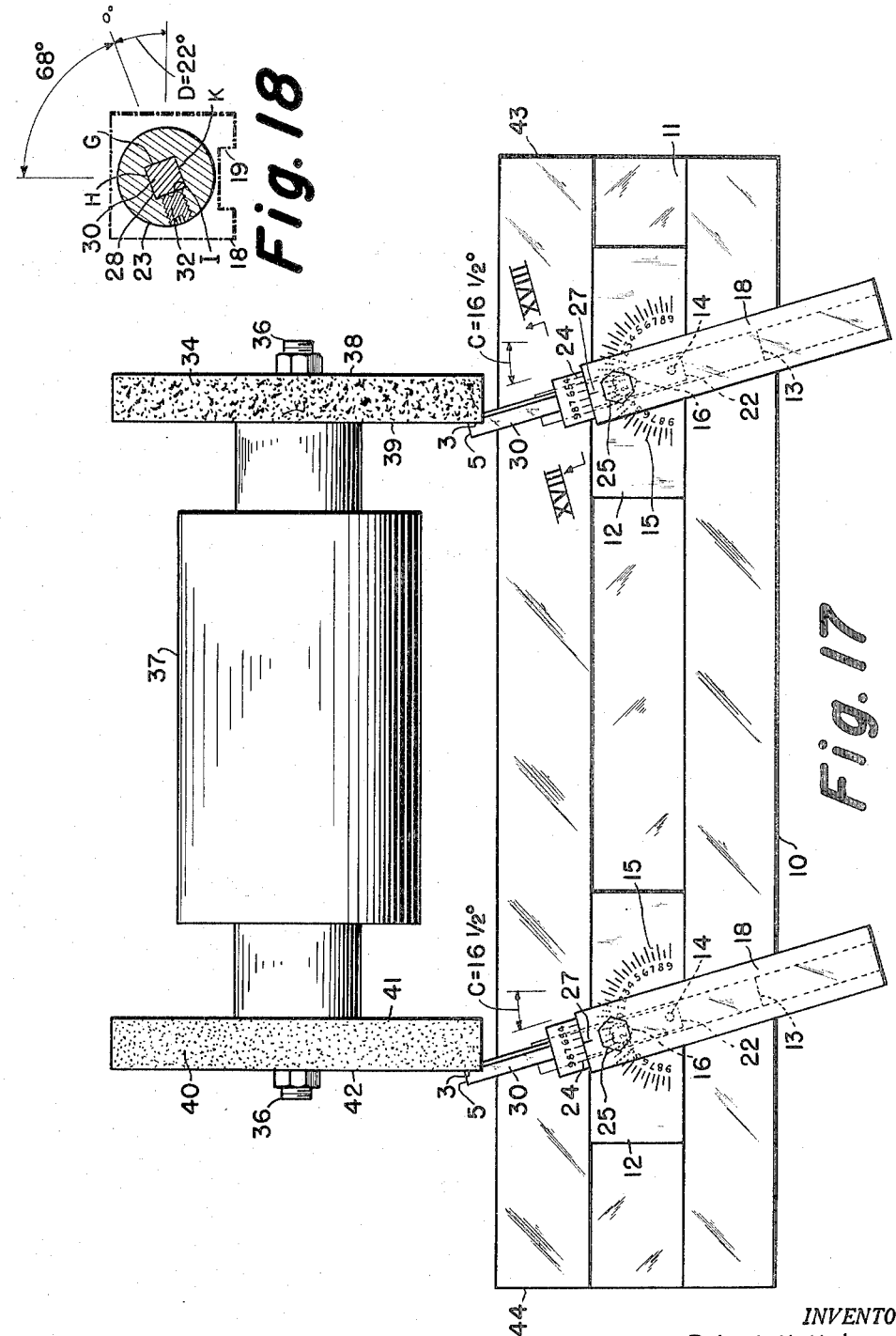

2,730,846
CUTTING TOOL GRINDING FIXTURE

Robert K. Heineman, Mount Lebanon, Pa.

Application March 20, 1952, Serial No. 277,635

3 Claims. (Cl. 51—122)

This invention relates to a cutting tool grinding fixture for use in grinding lathe tool cutter bits or other cutting tools from blanks, or for reshaping lathe tool cutter bits or other cutting tools.

In the accompanying drawings which illustrate one form of a lathe tool cutter bit, and a cutting tool grinding fixture for shaping the tool bit—

Figure 8:
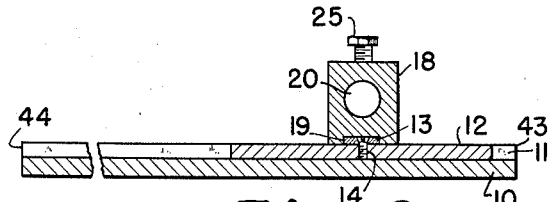
Figure 7:
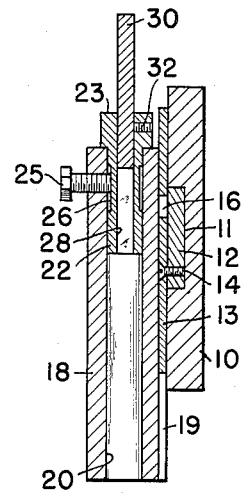
Figure 9:
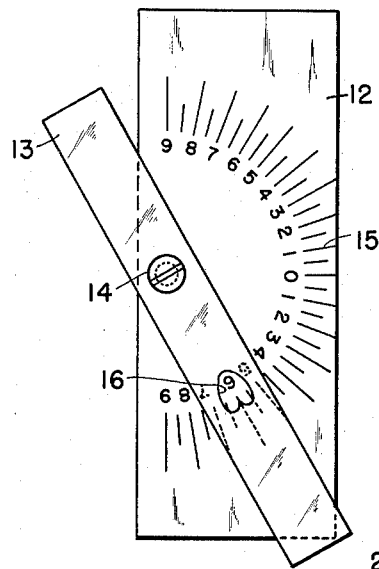
Figure 10:
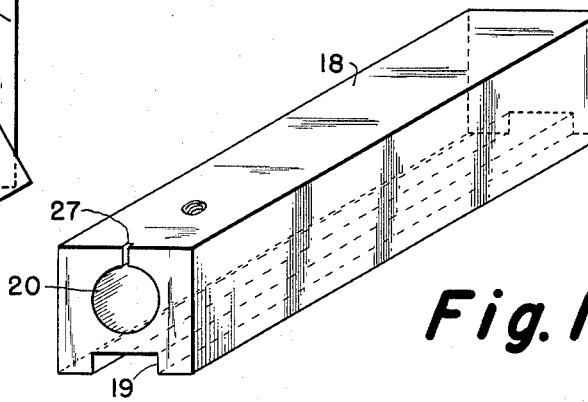
Figure 11:
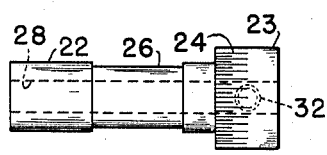
Figure 12:
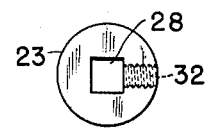

Figure 1 is a plan view of a lathe tool cutter bit;
Figure 2 is a side elevation of the bit shown in Figure 1;
Figure 3 is an end elevation of the bit shown in Figure 1;
Figure 4 is a plan view of a cutting tool grinding fixture having a tool bit blank mounted therein;
Figure 5 is a front elevation of the fixture and tool bit blank shown in Figure 4;
Figure 6 is a side elevation of the fixture and tool bit blank shown in Figure 4;
Figure 7 is a longitudinal section taken on the line VII—VII of Figure 4;
Figure 8 is a transverse section taken on the line VIII—VIII of Figure 4;
Figure 9 is a plan view of a slide and guide bar pivoted thereto which form a part of the grinding fixture;
Figure 10 is a perspective view of a tool holder;
Figure 11 is a plan view of a sleeve for holding the tool bit;
Figure 12 is an end elevation of the sleeve shown in Figure 11;
Figure 13 is a plan view of the grinding fixture, tool bit blank and coarse and fine grinding wheels mounted on a grinding motor, illustrating their positions in grinding one surface of the cutter bit on the coarse wheel;
Figure 14 is a transverse section taken on the line XIV—XIV of Figure 13;
Figure 15 is a view similar to Figure 13, but illustrating the parts in two positions for grinding another surface of the cutter bit on the coarse wheel on the right, and for sliding across and grinding on the fine wheel at the left;
Figure 16 is a transverse section taken on the line XVI—XVI of Figure 15;
Figure 17 is a view similar to Figure 15, but illustrating the parts in two positions to grind still another surface of a cutter bit on the coarse and fine wheels; and
Figure 18 is a transverse section taken on the line XVIII—XVIII of Figure 17.

Referring more particularly to the accompanying drawings, Figures 1–3 illustrate one form of a lathe tool cutter bit which may be ground by the use of my grinding fixture, it being understood that other shapes of cutter bits and other tools can likewise be ground or finished by the use of my grinding fixture. The cutter bit has a front surface 1, a side surface 2, and a top surface 3. The bit has a side clearance angle of 12°, which is the vertical slope of surface 2, and is illustrated in Figures 1 and 3 by the reference letter A. The bit has a front clearance angle of 8°, represented in Figure 2 by the reference letter B. That is, the edge 5 formed by the surfaces 1 and 2 has a vertical slope of 8°. The bit has a back rake of 16½°; that is, the horizontal backward slope of surface 3 taken in the plane P—P passing through the longitudinal axis of the bit has a horizontal backward slope of 16½°, represented in Figure 2 by the reference letter C. The bit has a side rake of 22°; that is, the horizontal sideward slope of surface 3 along the top of surface 1 and the edge 8 of surface 3 has a slope of 22°, represented in Figure 3 by the reference letter D. The cutting edge 6 formed by the intersection of surfaces 2 and 3 extends at an angle of 20° to the longitudinal axis of the cutter bit, this angle being represented in Figure 1 by the reference letter E. The edge 7 formed by the intersection of surfaces 1 and 3 extends at an angle of 55° relative to the longitudinal axis of the bit, this angle being represented in Figure 1 by the reference letter F.

Referring to Figures 4–12, the grinding fixture comprises a base 10 having a slot 11 extending parallel to the longitudinal axis of the base. A slide 12 fits into the slot 11 and is guided in its movement relative to the base by the slot. A guide bar 13 is pivoted to the slide 12 by a screw 14, the arrangement being such that the guide bar can be rotated to various angular positions and fixed in any desired position relative to the slide 12 by tightening the screw 14. The slide 12 is provided with a scale 15 to indicate such angular position, and the guide bar has an index 16 for cooperation with the scale.

A tool holder 18 has a slot 19 in its bottom, which fits over the guide bar 13 so that the tool holder can be moved longitudinally of the guide bar. The tool holder 18 is in the shape of an elongated block and is provided with a bore 20 extending longitudinally through it. A sleeve 22 is received in the bore 20. The sleeve has a head 23, having a scale 24 marked thereon. The sleeve 22 can be rotated in the bore 20 and fixed in any desired position by means of a lock-screw 25 threaded in the holder 18 and having its lower end adapted to be received in a reduced diameter portion 26 in the sleeve 22. The tool holder 18 has an index mark 27 to cooperate with the scale 24. The sleeve 22 has a mortise 28 for receiving a tool bit cutter blank 30, the end of which is to be ground. The cutter bit blank 30 has flat surfaces G, H, I and K. The cutter bit 30 is locked in the mortise 28 by means of a set screw 32 threaded in the head 23 of the sleeve 22.

My grinding fixture can be used in the following manner in order to grind the tool bit illustrated in Figures 1–3, it being understood that the sequence of steps used in grinding the various faces may be varied.

*Grinding surface 1 with angle F=55° and angle B=8°*

In carrying out this step, the parts are in the positions shown in Figures 13 and 14.

The grinding fixture is used in connection with any standard high speed grinder. The fixture is installed on the grinder by bolting the base 10 to the tool supports (not shown) which are standard equipment on high speed grinders. The grinder has a coarse grinding wheel 34 mounted on a shaft 36 on the right side of the high speed motor 37. Wheel 34 has two side surfaces 38 and 39 for grinding. A fine grinding wheel 40 is mounted on the other end of shaft 36 on the left side of the motor 37, and has two side grinding surfaces 41 and 42. The base 10 is adjusted so that its longitudinal axis is perpendicular to the grinding surfaces 38, 39, 41 and 42. The base 10 extends from a point 43 sufficiently to the right of surface 38 to accommodate the slide 12, to a point 44 sufficiently to the left of surface 42 to accommodate the slide 12.

A cutter bit blank 30 is inserted into the mortise 28 in the sleeve 22, and is fastened securely by tightening the set screw 32.

The lock screw 25 is loosened, and the sleeve 22 and head 23 are rotated so that the 0° point of scale 24 is rotated to the left 8°, where the 8° point of scale 24 coincides with the index mark 27. (In referring to left or right rotation of the 0° point of scale 24, it is assumed that the viewer is looking down on the grinding fixture facing in the direction the cutter bit 30 extends from the head 23, left rotation being movement of the 0° point to the left of index mark 27, and right rotation being movement of the 0° point to the right of index mark 27.) The lock screw 25 is tightened, locking the sleeve 22 and the cutter bit 30 in one grinding position.

The screw 14 is loosened, and the guide bar 13 is swung to the right on the screw 14 pivot until the index 16 in the guide bar 13 coincides with the 55° point on the right side of the scale 15 of the slide 12. (In referring to left or right movement of the guide bar and the left or right side of the scale 15, it is assumed that the viewer is looking down on the grinding fixture facing in the direction the cutter bit 30 extends from the head 23 when the tool holder 18 is placed in position on guide bar 13, left being movement or position to the left of the 0° point on scale 15, and right being movement or position to the right of the 0° point on scale 15.) The screw 14 is tightened, locking the guide bar 13 in the proper grinding position.

The tool holder 18, containing the sleeve 22 and cutter bit 30, is placed on the guide bar 13, and the bit 30, locked in one position in sleeve 22, and guided in the other position by guide bar 13, is moved into side 39 of coarse wheel 34 by sliding the tool holder 18 on the surface of base 10, guided by guide bar 13. With light pressure against the surface 39 of wheel 34, which is revolving at high speed, the end of cutter bit 30 is slid back and forth across surface 39 while maintaining continuous contact with the wheel surface in its fixed angular position. This is made possible by means of the combination of the tool holder 18 sliding on the guide bar 13 concurrently with the slide 12 sliding in the slot 11. The tool holder 18 is lifted from the guide bar 13 every few seconds and the end of the bit 30 is dipped in cool water. This procedure is continued until about one-third of the end of the bit 30 is ground off, and a continuous surface 1 appears. No fine grinding is required on this surface 1.

*Grinding surface 2 with angle A=12° and angle E=20°*

This operation is carried out with the parts in the positions shown in Figures 15 and 16.

The lock screw 25 is loosened, and sleeve 22 and head 23 are rotated so that the 0° point of scale 24 is rotated to the right 12°, where the 12° point of scale 24 coincides with the index mark 27. The lock screw 25 is tightened. The screw 14 is loosened, and the guide bar 13 is swung left on the screw 14 pivot until the index 16 in the guide bar 13 coincides with the 20° point on the left side of the scale 15 of the slide 12. The screw 14 is tightened. Grinding is first done on the coarse wheel 34, with the grinding fixture as shown in the position at the right side of Figure 15. The tool holder 18 is placed on the guide bar 13, and the bit 30 is moved into side 38 of coarse wheel 34. While applying light pressure against the side 38 of the wheel 34, the bit 30 is slid back and forth against the wheel surface 38 by means of the concurrent sliding of the tool holder 18 on the guide bar 13 and the slide 12 in the slot 11. The tool holder 18 is lifted from the guide bar 13 every two or three seconds and the end of the bit 30 is dipped in cool water. The grinding is continued until a single continuous surface 2 appears.

The grinding fixture is then slid in slot 11 over to the fine wheel 40, as shown in the position at the left side of Figure 15. The bit 30 is moved into the side 41 of the fine wheel, and while very light pressure is applied, the bit 30 is slid back and forth against the wheel surface 41 by means of the concurrent sliding of the tool holder 18 on the guide bar 13 and the slide 12 in the slot 11. The tool holder 18 is lifted every two or three seconds and the end of bit 30 is dipped in cool water. The grinding is continued until the fine grinding marks appear continuous on the surface 2.

*Grinding of surface 3 to form angle C=16½° and angle D=22°*

This operation is carried out with the parts in the positions shown in Figures 17 and 18.

The lock screw 25 is loosened and the sleeve 22 and head 23 are rotated so that the 0° point of the scale 24 is rotated to the right 68° (90—22° for the 22° angle D), where the 68° point of scale 24 coincides with the index mark 27. The lock screw 25 is tightened. The screw 14 is loosened, and the guide bar 13 is swung left on the screw 14 pivot until the index 16 in the guide bar 13 coincides with the 16½° point on the left side of the scale 15 of the slide 12. The screw 14 is tightened. Grinding is first done on the coarse wheel 34, with the grinding fixture as shown in the position at the right side of Figure 17. The tool holder 18 is placed on the guide bar 13, and the bit 30 is moved into side 39 of the coarse wheel 34. The bit 30 is not slid back and forth against the wheel surface 39, but is moved into and out of contact by causing the slide 12 to move in the slot 11 while preventing relative movement of the tool holder 18 on the guide bar 13. The tool holder 18 is lifted very frequently and the bit 30 is dipped in cool water. Grinding is continued until one continuous surface 3 appears.

The grinding fixture is then slid in slot 11 over to the fine wheel 40, as shown in the position at the left side of Figure 17. The bit 30 is moved into side 42 of the fine wheel 40, and while very light pressure is applied, the bit 30 is slid back and forth in even angular contact with surface 42 of the wheel, by means of the concurrent sliding of the tool holder 18 on the guide bar 13 and the slide 12 in the slot 11. The tool holder 18 is lifted every two or three seconds and the end of the bit 30 is dipped in cool water. The grinding is continued until the fine grinding marks appear continuous on the surface 2.

It will be noted that each of the surfaces 1, 2 and 3 of the bit must conform to two specifications. The most important surface is surface 3, which must conform to a back rake specification (angle C shown in Figure 2), and a side rake specification (angle D shown in Figure 3). Prior known grinding fixtures are capable at best of meeting only one specification at a time. On prior known fixtures, while a surface is being ground to meet one specification, the other specification can and probably will be disturbed. On them, a rotating sleeve will take care of side rake (angle D), but will not take care of back rake (angle C). Even as to a single specification, the bit in prior known fixtures is partially guided "free hand," causing inaccurate results. In my grinding fixture, the combination of the rotatable sleeve 22 and the pivoted guide bar 13, which can be fixed in various angular positions relative to the slide 12, enables one to use the fixture for grinding a surface to conform to both back rake specification and side rake specification in the same grinding step. In my grinding fixture, both of these specifications are handled simultaneously, as shown in Figures 17 and 18. Similarly, a rotating sleeve alone will handle side clearance (angle A), but not side shape such as the angle E shown in Figure 1. In my grinding fixture, both of these specifications are handled at the same time, as shown in Figures 15 and 16.

The advantages of my grinding fixture will be apparent when it is understood that each of the surfaces 1, 2 and 3 of the bit slopes in two directions. Prior known devices which form only one slope of a surface, or at best only one surface at a time, are not satisfactory because, even though one slope of a surface is ground perfectly, it is quite likely that this slope will be changed when the other slope of the surface is ground.

The combination in my grinding fixture of the tool holder 18 slidable on the guide bar 13, the fixing of the guide bar 13 in various angular positions with respect to the slide 12, and the sliding of the slide 12 in its slot 11 result in several advantages.

1. It permits moving the bit into contact with the grinding wheel in perfect position at the moment of contact, which is very important in the finish stages;

2. It permits moving the bit from a coarse grinding wheel to a fine grinding wheel while maintaining an identical setting, thus saving time and material;

3. It permits a sliding motion of the bit across the side of the grinding wheel while maintaining precise angular contact; and 4. It eliminates all "free hand" guidance of the bit to maintain proper angular contact with the grinding wheel, while retaining all the advantages of hand grinding.

Another advantage of my grinding fixture is that since the tool holder 18 is removable from the guide bar 13, it permits quick dipping of the bit into cool water during grinding. Otherwise, it would be necessary to provide an elaborate system of pumps, pans, collectors and filters in order to maintain a constant stream of coolant on the bit.

While the invention has been described in connection with grinding the surfaces of a lathe tool cutter bit, other cutting tools may be ground advantageously by the use of my grinding fixture, as for example, similar bits used in other machines such as shapers, and tools used by dentists, engravers and leather workers in which one or more of the surfaces must meet two specifications.

The invention is not limited to the preferred embodiment, but may be otherwise embodied or practiced within the scope of the following claims.

I claim:

1. A device for grinding a cutting tool, comprising a grinding wheel, a cutting tool grinding fixture adapted to be mounted on a fixture support and hold a tool at a predetermined angle as it is slid across the face of the grinding wheel, said fixture comprising a base having a flat bearing surface for a tool holder and provided with a slot extending at right angles to the face of the grinding wheel across which the tool is to be slid, a slide movable in said slot, a guide bar pivoted on said slide with its pivot point fixed relative to said slide, means for holding said guide bar in different angular positions on said slide, a tool holder having a flat bottom surface bearing against the bearing surface of said base, said tool holder having a slot in its bottom surface extending longitudinally of said tool holder for receiving said guide bar, a sleeve mounted in said tool holder and extending from one end thereof and rotatable about its axis, means for securing said sleeve in said tool holder and means for securing a tool in said sleeve.

2. A device according to claim 1, wherein the top surface of said slide when received in its slot in said base lies substantially flush with the top surface of said base and wherein the slot in the bottom of said tool holder is at least as deep as the thickness of said guide bar so that said tool holder rests on said base when it is guided in its movement by said guide bar.

3. A device according to claim 1, wherein said tool holder is freely detachable from said guide bar by a vertical lifting movement.

References Cited in the file of this patent

UNITED STATES PATENTS

| | | |
|---|---|---|
| 676,413 | Boys | June 18, 1901 |
| 736,193 | Barr | Aug. 11, 1903 |
| 1,385,649 | Sherman | July 26, 1921 |
| 1,783,540 | Hogg et al. | Dec. 2, 1930 |
| 1,807,999 | McMurtry | June 2, 1931 |
| 2,365,759 | Howe | Dec. 26, 1944 |